United States Patent
Jin

(10) Patent No.: US 10,531,162 B2
(45) Date of Patent: Jan. 7, 2020

(54) REAL-TIME INTEGRATED DATA MAPPING DEVICE AND METHOD FOR PRODUCT COORDINATES TRACKING DATA IN IMAGE CONTENT OF MULTI-USERS

(71) Applicant: FINGERPLUS INC., Seoul (KR)

(72) Inventor: Sung Min Jin, Seoul (KR)

(73) Assignee: CJ ENM CO., LTD., Seoul (KR)

( * ) Notice: Subject to any disclaimer, the term of this patent is extended or adjusted under 35 U.S.C. 154(b) by 0 days.

(21) Appl. No.: 15/772,093

(22) PCT Filed: Nov. 2, 2016

(86) PCT No.: PCT/KR2016/012493
§ 371 (c)(1),
(2) Date: Apr. 30, 2018

(87) PCT Pub. No.: WO2017/078383
PCT Pub. Date: May 11, 2017

(65) Prior Publication Data
US 2018/0316983 A1    Nov. 1, 2018

(30) Foreign Application Priority Data
Nov. 4, 2015  (KR) .................... 10-2015-0154798

(51) Int. Cl.
*H04N 21/81*      (2011.01)
*H04N 21/431*    (2011.01)
*G06T 7/246*     (2017.01)

(52) U.S. Cl.
CPC ........... *H04N 21/812* (2013.01); *G06T 7/246* (2017.01); *H04N 21/431* (2013.01); *G06T 2207/10016* (2013.01)

(58) Field of Classification Search
CPC ........... H04N 21/812; H04N 21/23418; H04N 21/431; G06T 7/246; G06T 2207/10016
See application file for complete search history.

(56) References Cited

U.S. PATENT DOCUMENTS

| 2003/0012410 A1* | 1/2003 | Navab | G06K 9/209 382/103 |
| 2006/0067562 A1* | 3/2006 | Kamath | G06T 7/254 382/103 |

(Continued)

FOREIGN PATENT DOCUMENTS

| JP | 2007-272732 A | 10/2007 |
| JP | 2015-506516 A | 3/2015 |

(Continued)

OTHER PUBLICATIONS

International Search Report for PCT/KR2016/012493 dated Jan. 24, 2017 from Korean Intellectual Property Office.

*Primary Examiner* — Randy A Flynn
(74) *Attorney, Agent, or Firm* — Studebaker & Brackett PC

(57) ABSTRACT

A real-time integrated data mapping device for product coordinates tracking data in an image content of multi-users, includes: a web interface providing module configured to provide, to a user terminal, a web interface; a product coordinates tracking request receiving module configured to receive, from the user terminal, a request for product coordinates tracking with respect to the product designated by the user among the products displayed in the image content; a product coordinates automatic tracking module configured to provide, to the user terminal, automatic tracking coordinates in real-time by performing automatic tracking for the product coordinates tracking requested; and a final product coordinates generation module configured to receive, from the user terminal, the correction coordinates corrected by the touch input of the user and apply, to the automatic tracking coordinates, the correction coordinates received from the user terminal to generate final product coordinates.

10 Claims, 9 Drawing Sheets

(56) References Cited

U.S. PATENT DOCUMENTS

| | | | | |
|---|---|---|---|---|
| 2009/0022473 A1* | 1/2009 | Cope | ............... | H04N 21/6587 386/278 |
| 2012/0183229 A1* | 7/2012 | McDevitt | ......... | H04N 21/47815 382/218 |
| 2013/0074139 A1* | 3/2013 | Cope | ............... | H04N 21/6587 725/114 |
| 2013/0177203 A1* | 7/2013 | Koo | ................ | G06K 9/00671 382/103 |
| 2013/0212477 A1* | 8/2013 | Averbuch | .......... | H04N 21/4725 715/719 |
| 2014/0245529 A1* | 9/2014 | Beckman | .......... | A41D 13/0531 2/468 |
| 2015/0055821 A1* | 2/2015 | Fotland | ............... | G06K 9/3241 382/103 |
| 2015/0097812 A1* | 4/2015 | Huang | ............... | G06F 3/0425 345/175 |
| 2015/0379606 A1* | 12/2015 | Vaidyanathan | ....... | G06F 16/433 705/26.62 |

FOREIGN PATENT DOCUMENTS

| | | |
|---|---|---|
| KR | 10-2010-0047591 A | 5/2010 |
| KR | 10-2012-0052569 A | 5/2012 |
| KR | 10-1517359 B1 | 6/2015 |

\* cited by examiner

REAL-TIME INTEGRATED DATA MAPPING DEVICE AND METHOD FOR PRODUCT COORDINATES TRACKING DATA IN IMAGE CONTENT OF MULTI-USERS

TECHNICAL FIELD

The present invention relates to tracking coordinates of a product in an image content and more particularly, to real-time integrated data mapping device and method for product coordinates tracking data in an image content of multi-users.

BACKGROUND ART

Recently, a product placement (PPL) advertisement method which advertises a product through dramas, movies, or the like has been used as one main advertisement method.

The PPL advertisement is an advertisement method in which a product is exposed in a video content such as a movie and a drama, and in many cases, the PPL advertisement leads to an actual increase in merchandise sales.

However, since the PPL advertisement product is often exposed naturally in the video content, it is sometimes impossible to distinguish whether or not the product is actually a PPL advertisement product. In the case of advertisers paying a large amount of advertising fees, it is necessary to increase an advertising effect by directly or indirectly recognizing to a viewer that the PPL advertisement product is an advertisement product.

However, even if the PPL advertisement product is displayed in the video content, there is a problem in that it is not easy to display the PPL advertisement product of which a position is changed every frame. There is a problem in that a great deal of manual work is required to display the PPL advertisement product moving every frame for each frame.

Meanwhile, in the related art, since PPL advertisement product information is collected one by one and uploaded by a business operator, there is a problem in that a considerable difficulty and a workload are required in collecting the PPL advertisement product information and data processing.

DETAILED DESCRIPTION OF THE INVENTION

Technical Problem

An object of the present invention is to provide a real-time integrated data mapping device for product coordinates tracking data in an image content of multi-users.

Another object of the present invention is to provide a real-time integrated data mapping method for product coordinates tracking data in an image content of multi-users.

Technical Solution

An exemplary embodiment of the present invention provides a real-time integrated data mapping device for product coordinates tracking data in an image content of multi-users, including: a web interface providing module configured to provide, to a user terminal, a web interface for tracking a product in the image content; a product coordinates tracking request receiving module configured to receive, from the user terminal, a request for product coordinates tracking with respect to the product designated by the user among the products displayed in the image content which is playedback on the web interface provided by the web interface providing module; a product coordinates automatic tracking module configured to provide, to the user terminal, automatic tracking coordinates in real-time by performing automatic tracking for the product coordinates tracking requested by the product coordinates tracking request receiving module; and a final product coordinates generation module configured to receive, from the user terminal, the correction coordinates corrected by the touch input of the user with respect to the automatic tracking coordinates on the web interface of the user terminal and apply, to the automatic tracking coordinates, the correction coordinates received from the user terminal to generate final product coordinates.

The real-time integrated data mapping device may further include a product coordinates storage module configured to store the final product coordinates in association with the image content and the product.

The real-time integrated data mapping device may further include a product information storage module configured to receive and store product information on the product from the user terminal.

The real-time integrated data mapping device may further include a product coordinates providing module configured to search, from the product coordinate storage module, the final product coordinates with respect to the product displayed in the playedback image content to provide the searched final product coordinates to another user terminal in real-time, when the image content is playedback on the web interface of another user terminal.

The real-time integrated data mapping device may further include a product information providing module configured to search the requested product information from the product information storage module to provide the searched product information to another user terminal in real-time, when the final product coordinates are provided by the product coordinates providing module and the product information on the product corresponding to the final product coordinates is requested by another user terminal.

The product coordinates automatic tracking module may be configured to detect and designate an object model through an object detection algorithm with respect to the product touch-input by the user on the user terminal, extract and register designated feature points as tracking feature points, and track the tracking feature points using a pyramid LK algorithm which is a sparse optical flow.

The product coordinates automatic tracking module may be configured to correct the tracking by combining a histogram-based CamShift algorithm when the shape of the object model is changed.

The product coordinates automatic tracking module may be configured to estimate a motion of the object model by applying a ransan algorithm based on the tracking feature points and update the object model by a similarity transformation algorithm through the tracking.

The product coordinates automatic tracking module may be configured to perform object detection by applying a Kalman filter when the updated object model is partially covered and the object model completely appears again to estimate the motion of the object model.

Another exemplary embodiment of the present invention provides a real-time integrated data mapping method for product coordinates tracking data in an image content of multi-users, including: providing, by a web interface providing module, a web interface for tracking a product in an image content to a user terminal; receiving, by a product coordinates tracking request receiving module, a request for product coordinates tracking from the user terminal with respect to the product designated by the user among the products displayed in the playedback image content, when the image content is playedback on the web interface provided by the web interface providing module; providing, by a product coordinates automatic tracking module, automatic tracking coordinates to the user terminal in real-time by performing automatic tracking for the product coordinates tracking requested by the product coordinates tracking request receiving module; receiving, by a final product coordinates generation module, the correction coordinates corrected by the touch input of the user from the user terminal with respect to the automatic tracking coordinates on the web interface of the user terminal; and applying, by the final product coordinates generation module, the received correction coordinates to the automatic tracking coordinates to generate the final product coordinates.

The real-time integrated data mapping method may further include storing, by a product coordinates storage module, the final product coordinates in association with the image content and the product.

The real-time integrated data mapping method may further include receiving and storing, by a product information storage module, product information on the product from the user terminal.

The real-time integrated data mapping method may further include searching, by a product coordinates providing module, the final product coordinates from the product coordinate storage module with respect to the product displayed in the playedback image content to provide the searched final product coordinates to another user terminal in real-time, when the image content is playedback on the web interface of another user terminal.

The real-time integrated data mapping method may further include searching, by a product information providing module, the requested product information from the product information storage module to provide the searched product information to another user terminal in real-time, when the final product coordinates are provided by the product coordinates providing module and the product information on the product corresponding to the final product coordinates is requested by another user terminal.

In the providing of the automatic tracking coordinates to the user terminal in real-time by performing automatic tracking for the product coordinates tracking requested by the product coordinates tracking request receiving module, the product coordinates automatic tracking module may be configured to detect and designate an object model through an object detection algorithm with respect to the product touch-input by the user on the user terminal, extract and register designated feature points as tracking feature points, and track the tracking feature points using a pyramid LK algorithm which is a sparse optical flow.

In the providing of the automatic tracking coordinates to the user terminal in real-time by performing automatic tracking for the product coordinates tracking requested by the product coordinates tracking request receiving module, the product coordinates automatic tracking module may be configured to correct the tracking by combining a histogram-based CamShift algorithm when the shape of the object model is changed.

In the providing of the automatic tracking coordinates to the user terminal in real-time by performing automatic tracking for the product coordinates tracking requested by the product coordinates tracking request receiving module, the product coordinates automatic tracking module may be configured to estimate a motion of the object model by applying a ransan algorithm based on the tracking feature points and update the object model by a similarity transformation algorithm through the tracking.

In the providing of the automatic tracking coordinates to the user terminal in real-time by performing automatic tracking for the product coordinates tracking requested by the product coordinates tracking request receiving module, the product coordinates automatic tracking module may be configured to perform object detection by applying a Kalman filter when the updated object model is partially covered and the object model completely appears again to estimate the motion of the object model.

Advantageous Effects of the Invention

According to the real-time integrated data mapping device and method for the product coordinates tracking data in the image content of the multi-users described above, when his/her own advertisement product is displayed while the user views the image content, the user requests product coordinates tracking in real-time and uploads the corresponding product information in real-time. As a result, even if the user does not directly order the advertisement, it is possible to advertise and sell the product through the image content at any time.

In the related art, both the advertisement information on the product and the product information are collected and uploaded, but in the present invention, an advertiser directly uploads the product information and corrects product coordinates tracking information, and thus, it is possible to more easily and conveniently provide and use the advertisement product.

In the related art, there is a disadvantage in that a time and cost for registering the product are very much consumed, and as a result, it is very difficult to secure the contents.

In order to solve the problem, various interfaces are provided and multi-user product registration is supported and simultaneously processed, and thus, a time for registering the product in the image is much reduced. This means that it is possible to quickly process the product registration for one or a plurality of images within a short period, and it is possible to quickly gather a lot of contents in a short period and quickly form a market.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
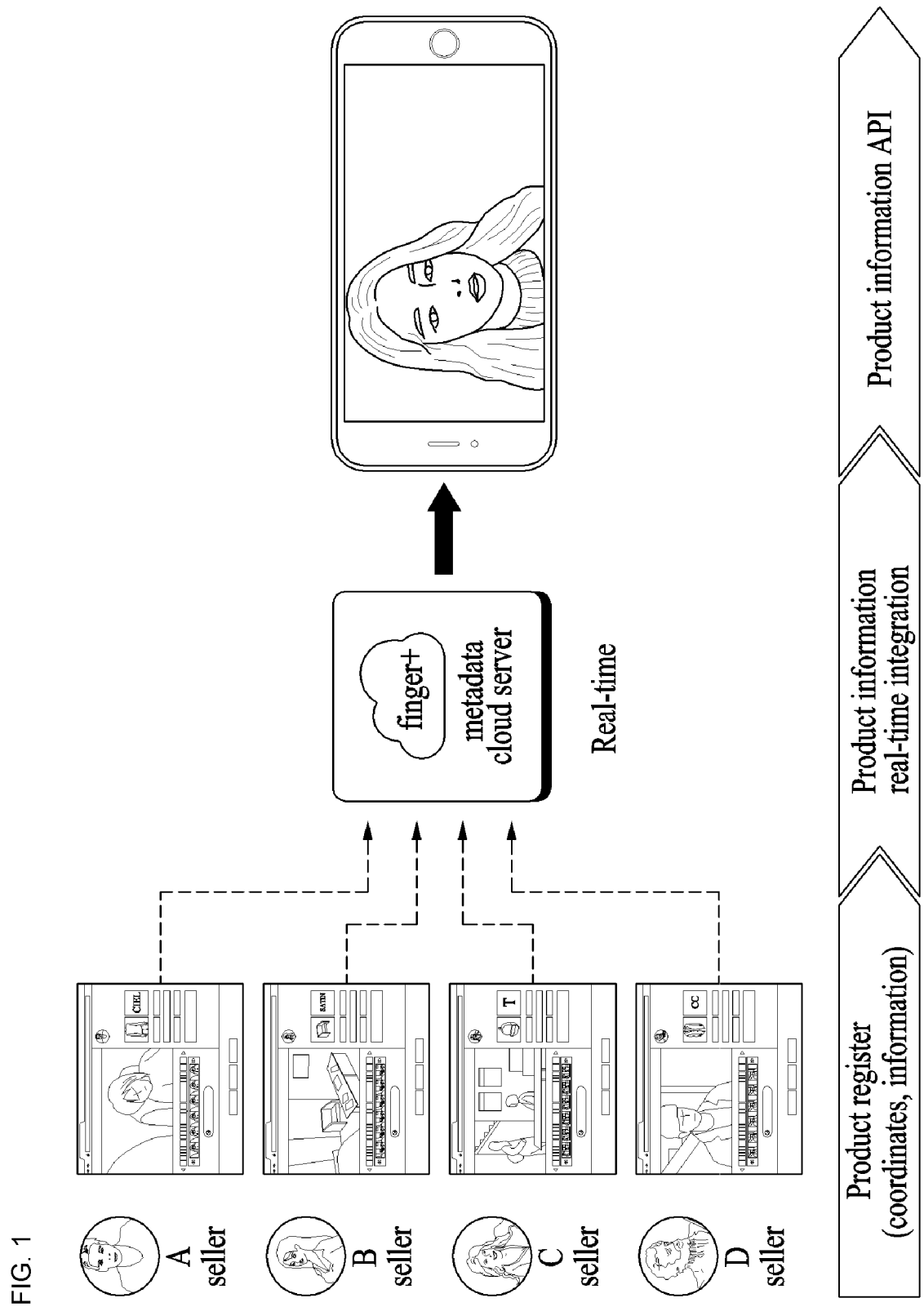
FIG. 1 is a schematic diagram of a real-time integrated data mapping device for product coordinates tracking data in an image content of multi-users according to an exemplary embodiment of the present invention.

The present invention may have various modifications and various exemplary embodiments and specific exemplary embodiments will be described in detail in the detailed description. However, this does not limit the present invention to specific exemplary embodiments, and it should be understood that the present invention covers all the modifications, equivalents and replacements included within the idea and technical scope of the present invention. In the description of each drawing, like reference numerals are used for like constitute elements.

Terms, such as first, second, and the like may be used to describe various components and the components should not be limited by the terms. The terms are used only to discriminate one constituent element from another component. For example, a first constituent element may be named as a second constituent element and similarly, the second constituent element may be named as the first constituent element without departing from the scope of the present invention. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, it should be understood that, when it is described that an element is "directly connected to" or "directly access" another element, it is understood that no element is present between the element and another element.

Terms used in the present application are used only to describe specific exemplary embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Hereinafter, preferred exemplary embodiments of the present disclosure will be described in detail with reference to the accompanying drawings.

FIG. 1 is a schematic diagram of a real-time integrated data mapping device for product coordinates tracking data in an image content of multi-users according to an exemplary embodiment of the present invention.

Referring to FIG. 1, a real-time integrated data mapping device 100 for product coordinates tracking data in an image content of multi-users according to an exemplary embodiment of the present invention (hereinafter, referred to as a 'real-time integrated data mapping device') is configured to increase convenience of product advertisement by uploading product information on his or her own sale products or manufacturing products while users directly view image contents unlike the related art.

The user may request automatic coordinates tracking with respect to a specific product while viewing a video on a web interface provided in the present invention, and the real-time integrated data mapping device 100 is configured by tracking the automatic coordinates tracking for the corresponding product to provide product coordinates to other users viewing the image content. The user uploads product information on the product in real-time, and the real-time integrated data mapping device 100 is configured to provide the product information to other users.

Unlike the related art, the users may directly designate an indirect product on the image content while viewing and upload the product information, respectively, so that the product coordinates and the product information may be easily and conveniently collected at any time.

Figure 2:
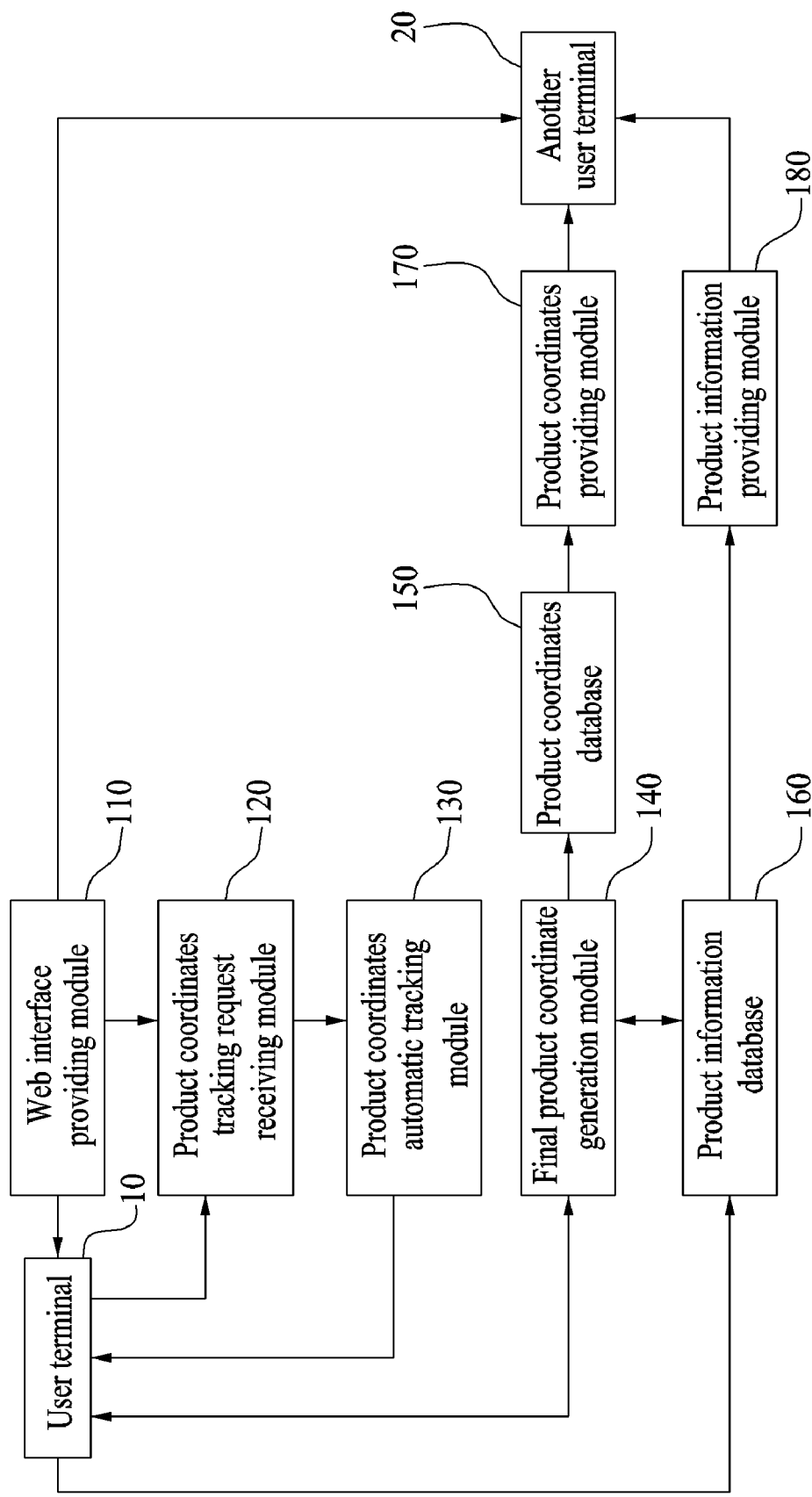
FIG. 2 is a block configuration diagram of the real-time integrated data mapping device for the product coordinates tracking data in the image content of multi-users according to the exemplary embodiment of the present invention.

FIG. 2 is a block configuration diagram of the real-time integrated data mapping device for product coordinates tracking data in an image content of multi-users according to the exemplary embodiment of the present invention.

The detailed configuration will be described with reference to FIG. 2.

A web interface providing module 110 may be configured to provide a web interface for tracking a product in the image content to a user terminal 10.

Figure 3:
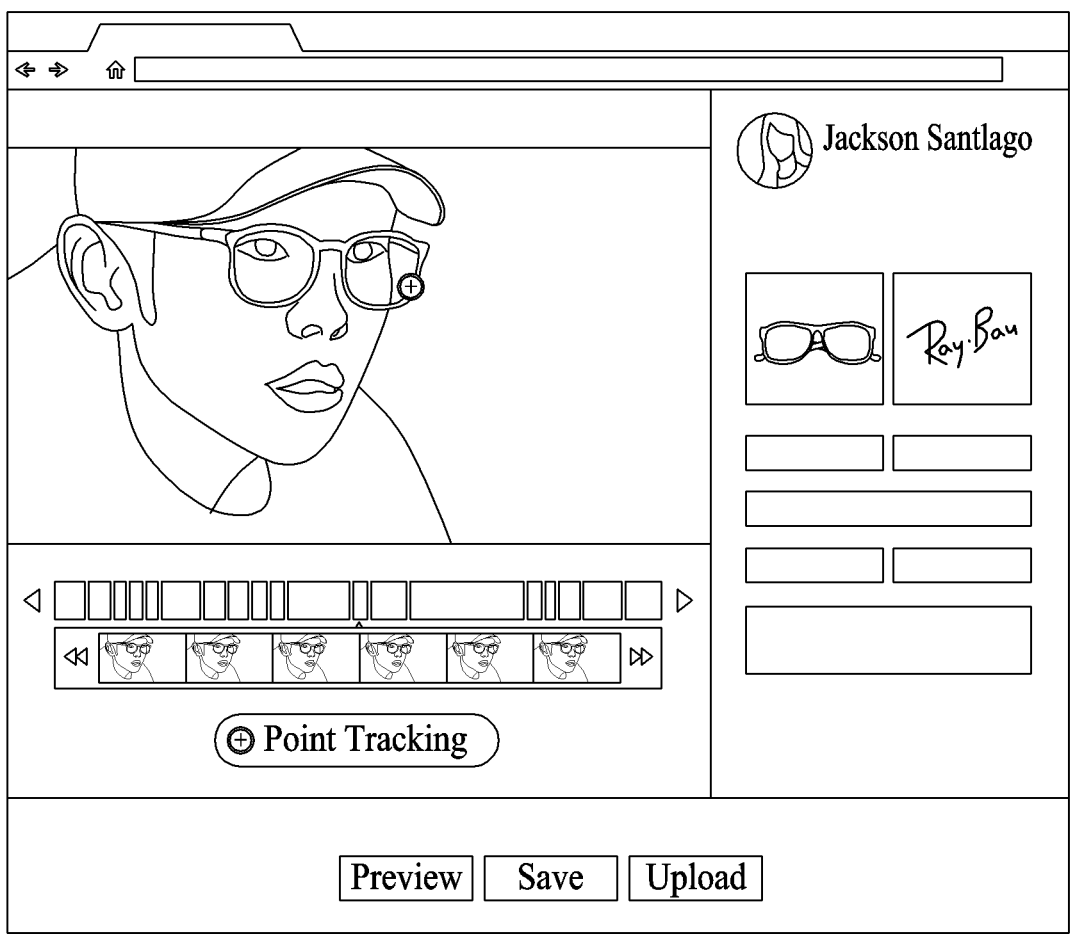
FIG. 3 is a user interface screen of the real-time integrated data mapping device for the product coordinates tracking data in the image content of multi-users according to the exemplary embodiment of the present invention.

FIG. 3 illustrates a web interface according to the present invention. As shown in FIG. 3, the image content provided by an OTT provider or the like may be playedback on the web interface, and the product coordinates with respect to the product displayed in the image content may be automatically tracked and displayed. In addition, if the product is selected by the user, the product information on the product may be inquired from a right side.

Such a web interface may be configured to interlock with the real-time integrated data mapping device 100.

A product coordinates tracking request receiving module 120 may be configured to receive, from the user terminal 10, a request for product coordinates tracking with respect to the product designated by the user among the products displayed in the image content which is playedback on the web interface provided by the web interface providing module 110. The user may designate a product by touch input on the web interface of the user terminal 10.

A product coordinates automatic tracking module 130 may be configured to provide, to the user terminal 10, automatic tracking coordinates in real-time by performing automatic tracking for the product coordinates tracking requested by the product coordinates tracking request receiving module 120.

The user terminal 10 may be configured to receive the automatic tracking coordinates and displays the automatic tracking coordinates on the web interface in real-time, input correction coordinates obtained by directly correcting the coordinates by touch input or the like of the user if there is an error in the automatic tracking, and transmit the correction coordinates to a final product coordinates generation module 140 in real-time.

The final product coordinates generation module 140 may be configured to receive, from the user terminal 10, the correction coordinates corrected by the touch input of the user with respect to the automatic tracking coordinates on the web interface of the user terminal 10.

The final product coordinates generation module 140 may be configured to apply the correction coordinates received from the user terminal 10 to the automatic tracking coordinates to generate final product coordinates.

A product coordinates storage module 150 may be configured to store the final product coordinates in association with the image content and the product. Such final product coordinates may be reused at any time with respect to the corresponding image content again.

A product information storage module 160 may be configured to receive and store product information on the product from the user terminal 10. Such product information may be information such as a product sale store or a product sale site, a price, a quantity, and a type.

A product coordinates providing module 170 may be configured to search, from the product coordinate storage module 150, the final product coordinates with respect to the product displayed in the playedback image content to provide the searched final product coordinates to another user terminal 20 in real-time, when the image content is playedback on the web interface of another user terminal 20. Another user terminal 20 may be configured to receive the final product coordinates to display the final product coordinates on the image content in combination.

A product information providing module 180 may be configured to search the requested product information in the product information storage module 160 to provide the searched product information to another user terminal 20 in real-time, when the final product coordinates are provided by the product coordinates providing module 170 and the product information on the product corresponding to the final product coordinates is requested by another user terminal 20. Another user terminal 20 may be configured to inquire the product information on the web interface and be connected to a purchasing site to purchase the product.

Figure 4:
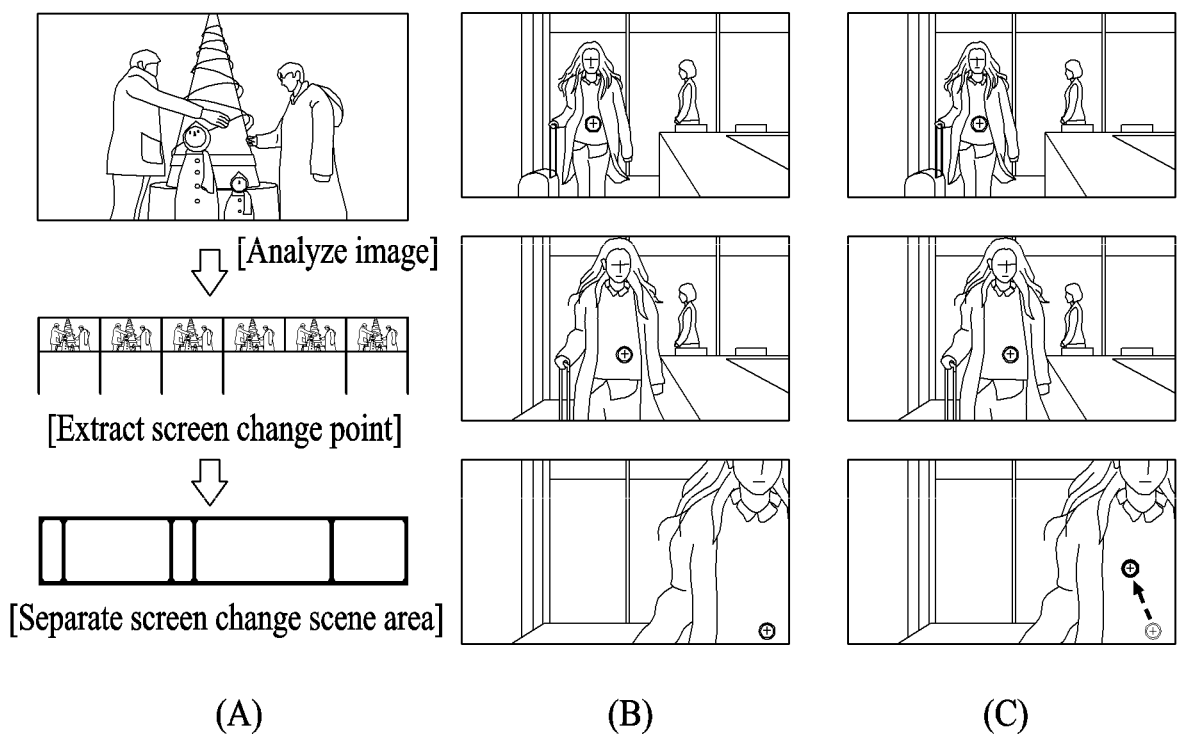
FIG. 4 is an operation configuration diagram of the real-time integrated data mapping device for the product coordinates tracking data in the image content of multi-users according to the exemplary embodiment of the present invention.

FIG. 4 is an operation configuration diagram of the real-time integrated data mapping device for the product coordinates tracking data in the image content of multi-users according to the exemplary embodiment of the present invention.

FIG. 4A illustrates a configuration of automatically recognizing a screen change scene. First, image analysis is performed to extract points where the screen is changed. In addition, a configuration of separating a screen change scene area according to the screen change scene point is illustrated.

FIG. 4B illustrates an automatic tracking function of product coordinates. When a point is set in a still image, the product coordinates are automatically tracked according to a change amount of the corresponding image in an image section of the corresponding scene.

FIG. 4C illustrates a drag-and-drop type coordinate correction. The product coordinates are automatically tracked and then the coordinates are finely corrected by a drag-and-drop method to correct the coordinates in detail.

Figure 5:
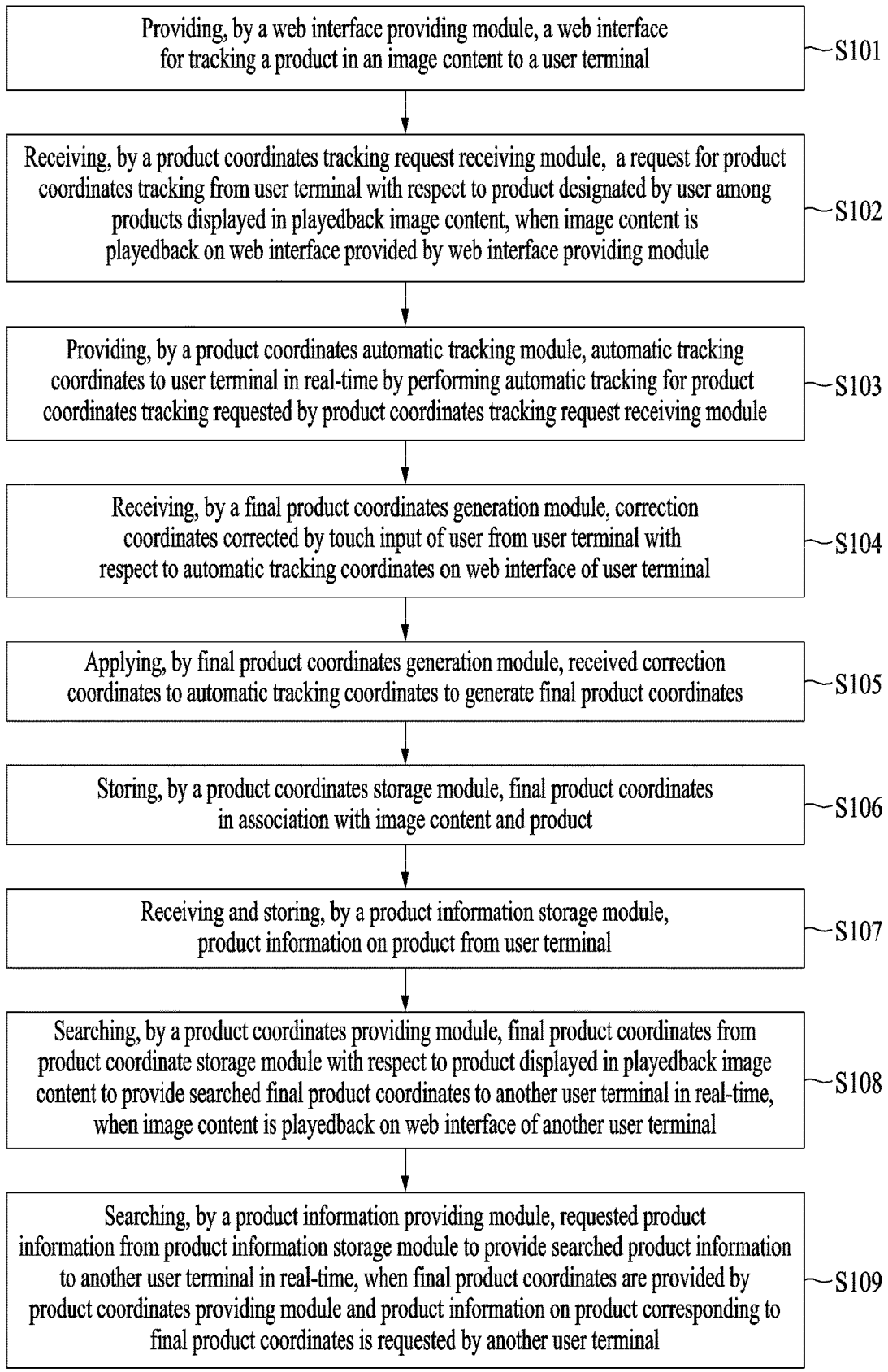
FIG. 5 is a flowchart of a real-time integrated data mapping method for product coordinates tracking data in an image content of multi-users according to another exemplary embodiment of the present invention.

FIG. 5 is a flowchart of a real-time integrated data mapping method for product coordinates tracking data in an image content of multi-users according to another exemplary embodiment of the present invention.

Referring to FIG. 5, the web interface providing module 110 provides, to the user terminal 10, a web interface for tracking products in an image content (S101).

Next, when the image content is playedback on the web interface provided by the web interface providing module 110, the product coordinate tracking request receiving module 120 receives, from the user terminal 10, a request for product coordinate tracking with respect to the product designated by the user among the products displayed in the playedback image content (S102).

Next, the product coordinates automatic tracking module 130 provides, to the user terminal 10, automatic tracking coordinates in real-time by performing automatic tracking for the product coordinates tracking requested by the product coordinates tracking request receiving module 120 (S103).

Next, the final product coordinates generation module 140 receives, from the user terminal 10, the correction coordinates corrected by the touch input of the user with respect to the automatic tracking coordinates on the web interface of the user terminal 10 (S104).

Next, the final product coordinates generation module 140 applies the received correction coordinates to the automatic tracking coordinates to generate the final product coordinates (S105).

Next, the product coordinates storage module 150 stores the final product coordinates in associated with the image content and the product (S106).

Next, the product information storage module 160 receives and stores product information on the product from the user terminal 10 (S107).

Next, when the image content is playedback on the web interface of another user terminal 20, the product coordinates providing module 170 searches, from the product coordinates storage module 150, the final product coordinates with respect to the product displayed in the playedback image content to provide the searched final product coordinates to another user terminal 20 in real-time (S108).

Next, when the final product coordinates are provided by the product coordinates providing module 170 and the product information on the product corresponding to the final product coordinates is requested by another user terminal 20, the product information providing module 180 searches the requested product information from the product information storage module 160 to provide the searched product information to another user terminal 20 in real-time (S109).

FIGS. 6 to 9 are detailed flowcharts of the real-time integrated data mapping method for the product coordinates tracking data in the image content of multi-users according to another exemplary embodiment of the present invention.

Figure 6:
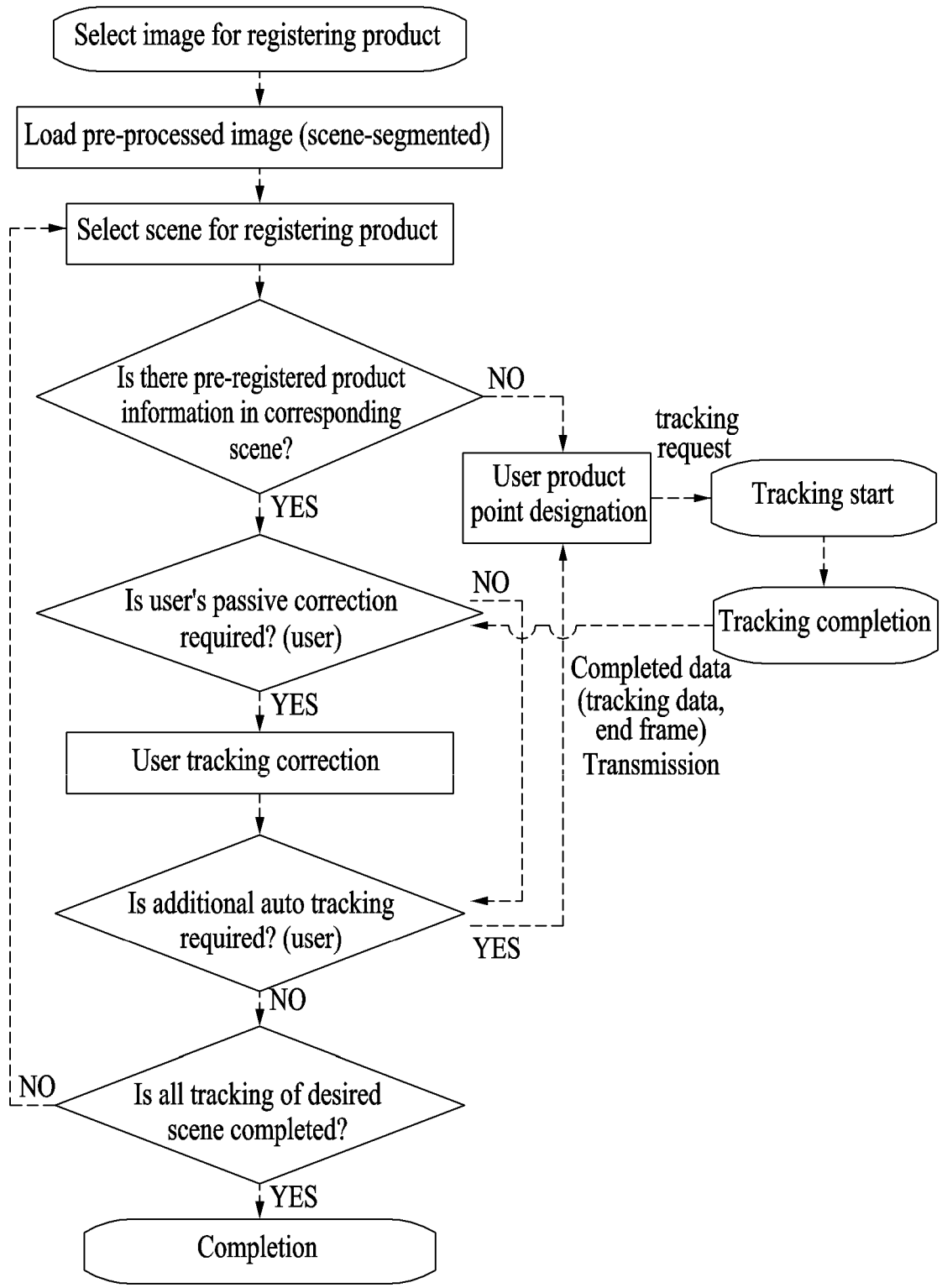
FIGS. 6 to 9 are detailed flowcharts of the real-time integrated data mapping method for the product coordinates tracking data in the image content of multi-users according to another exemplary embodiment of the present invention.

FIG. 6 shows a product registering process of multi-users.

In FIG. 6, the user may register a product at any time while viewing the image content, select a scene to be registered, determine whether product information exists in the scene, and perform automatic coordinates tracking or correction if necessary, respectively. The user specifies a product by designating points for the product.

Figure 7:
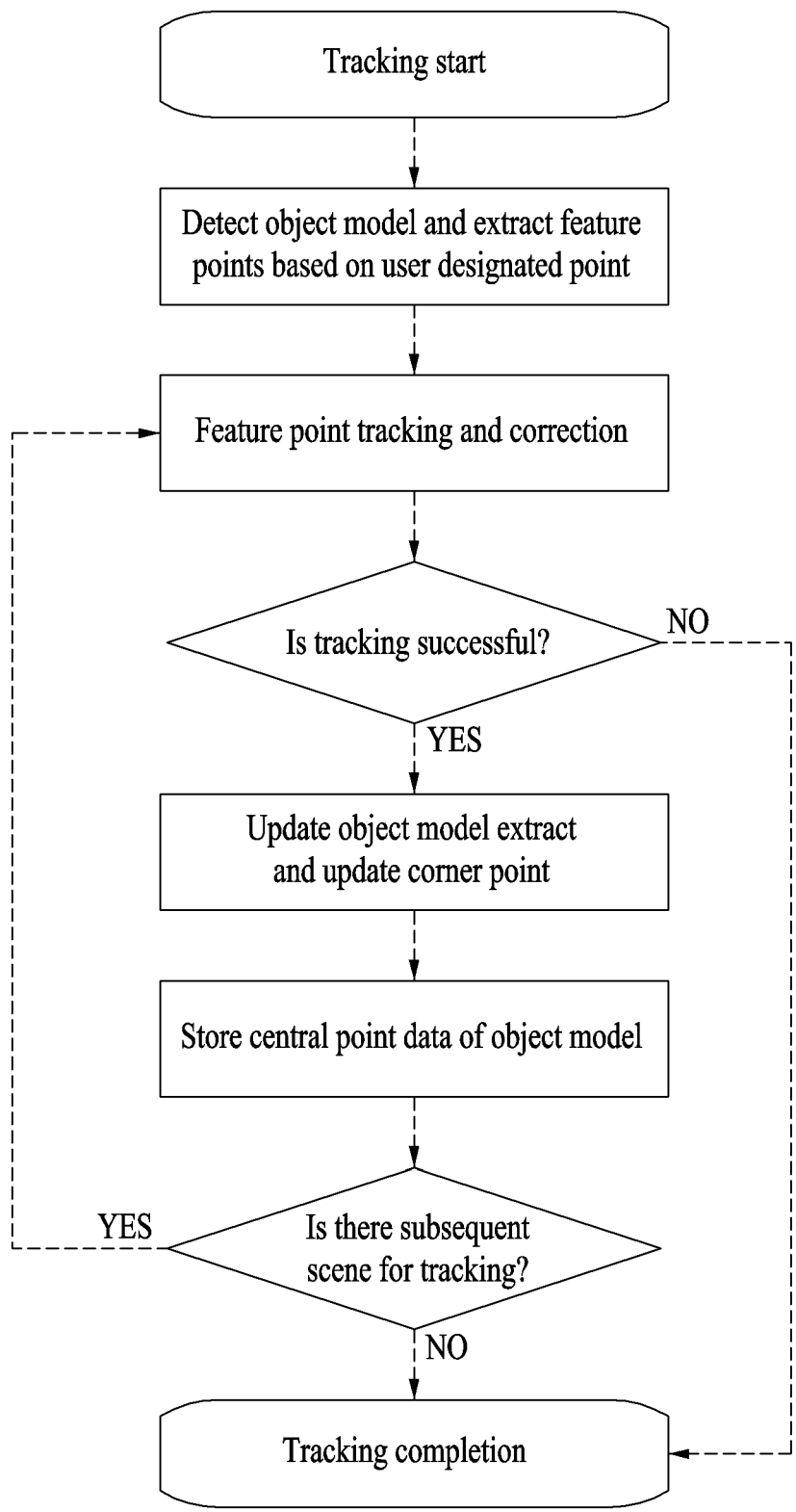

FIG. 7 illustrates automatic coordinates tracking of the product.

An object model is detected and designated by an object detection algorithm based on the points for the product designated by the user. In addition, feature points in an object model area are extracted and registered.

Tracking feature points are tracked using a pyramid LK algorithm which is a sparse optical flow. At this time, since the sparse optical flow may not exhibit good performance when a shape is changed like a human, a result product is corrected by combining a histogram-based CamShift algorithm in order to compensate the performance.

On the other hand, the motion of the object is estimated using a ransac algorithm based on the feature points. The motion of the object may include rotation, parallel translation, a change in size, or the like.

In addition, the object model is updated by a similarity transformation algorithm based on the estimated motion data. In addition, feature points of the updated object model are extracted and registered as the tracking feature points.

Here, when an object to be tracked is covered by something over regular part, an error may occur in tracking. In addition, even if the object completely reappears later, it may be difficult to be detected. Then, a Kalman filter is applied by using four vertexes of the extracted window, and the obtained data is used as correction information of a model obtained through similarity transformation every frame.

If it is determined that the tracking is no longer feasible, the motion of the object model may be estimated with Kalman filter data. At this time, a surrounding area is inspected based on the estimated data, and when the object appears again and the tracking feature points are detected, the tracking of the tracking features is continued according to the above sequence.

Meanwhile, when the object completely disappears from the screen, the tracking feature points are detected by a learned detection algorithm, and if the object appears again for a predetermined time, the detection is successful, and if not, the tracking is performed by updating the model by a similarity transformation algorithm. If the object is not detected for the predetermined time, the tracking ends.

Figure 8:
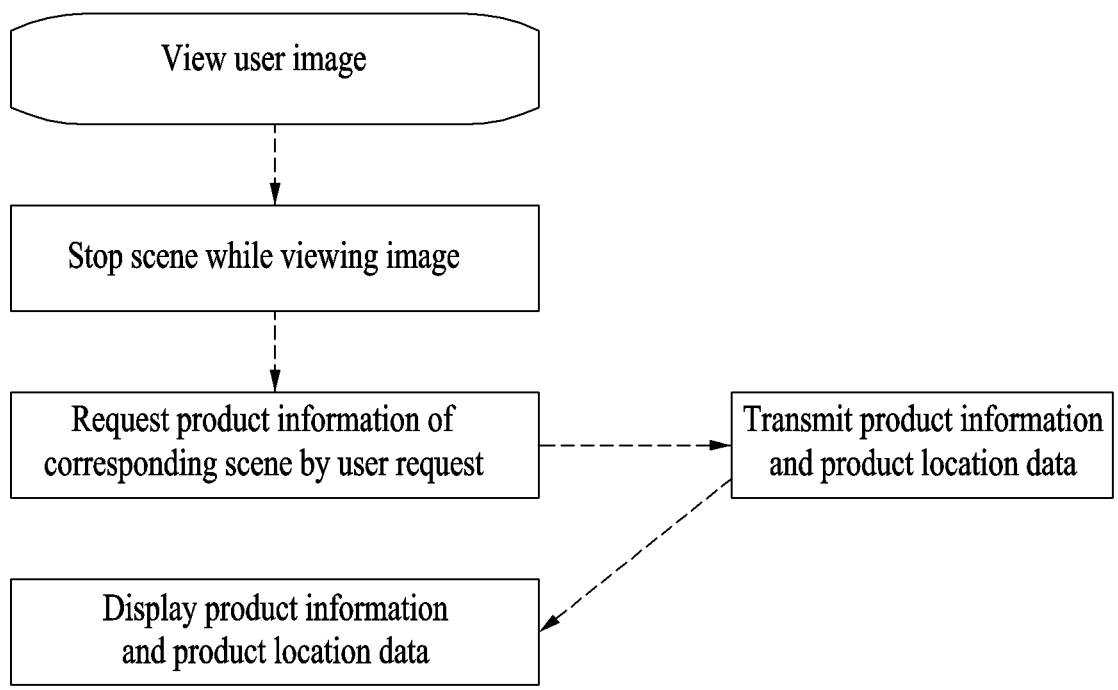

FIG. 8 illustrates a case of requesting product information after another user views the image content and then stops the playback of the image. Another user terminal 20 transmits the corresponding image information and current time line information to the real-time integrated data mapping device 100. In addition, the real-time integrated data mapping device 100 transmits the product coordinates and the product information to another user terminal 20, and another user terminal 20 displays the transmitted product coordinates and product information.

Figure 9:
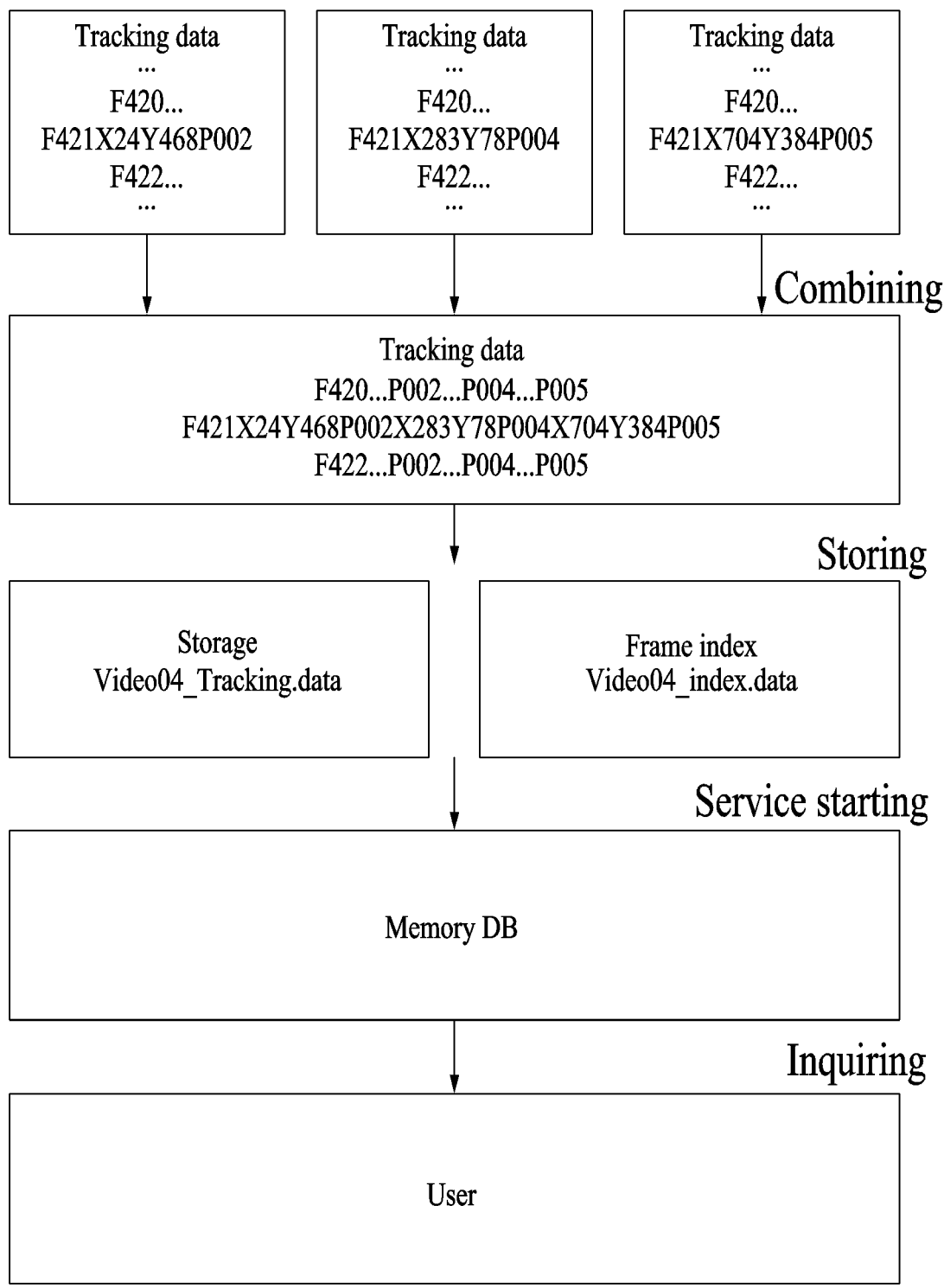

FIG. 9 illustrates tracking data.

First, data of each user is configured by a frame, coordinates, a product code, and other pieces of information. The data is uploaded in the real-time integrated data mapping device 100 and stored by combining the coordinates, the product information, and other pieces of information, and a frame at a specific time is configured to be easily searched by an index. In addition, in a service stat, the data is stored in a memory DB to be rapidly provided to another user terminal 20. Thereafter, the information is provided whenever there is a request from another user terminal 20.

As described above, although the present invention has been disclosed with reference to the preferred exemplary embodiments, those skilled in the art will appreciate that various modifications, additions and substitutions are possible, without departing from the scope and spirit of the invention as disclosed in the accompanying claims.

What is claimed is:

1. A real-time integrated data mapping device for product coordinates tracking data in an image content of multi-users, the device comprising:
a processor and a non-transitory storage communicatively coupled to the processor, wherein the processor:
provides, to a user terminal, a web interface for tracking a product in the image content;
receives, from the user terminal, a request for product coordinates tracking with respect to the product designated by the user among the products displayed in the image content which is played back on the provided web interface;
provides, to the user terminal, automatic tracking coordinates in real-time by performing automatic tracking for the requested product coordinates tracking;
receives, from the user terminal, correction coordinates corrected by a touch input of the user with respect to the automatic tracking coordinates on the web interface of the user terminal and applies, to the automatic tracking coordinates, the correction coordinates received from the user terminal to generate final product coordinates;
stores the final product coordinates in association with the image content and the product;
receives product information on the product from the user terminal, and stores the received product information;
detects that another user terminal is playing the image content on the web interface of the another user terminal;
searches, from the storage, the final product coordinates with respect to the product displayed in the image content being played on the another user terminal;
transmits, in real-time, the searched final product coordinates to the another user terminal that is playing the image content;
receives a request for the product information on the product corresponding to the final product coordinates, from the another user terminal that is playing the image content;
searches the requested product information from the storage; and
transmits, in real-time, the searched product information to the another user terminal that is playing the image content.

2. The real-time integrated data mapping device of claim 1, wherein the processor detects and designates an object model through an object detection algorithm with respect to the product corresponding to the touch input of the user on the user terminal, extracts and registers designated feature points as tracking feature points, and tracks the tracking feature points using a pyramid LK algorithm which is a sparse optical flow.

3. The real-time integrated data mapping device of claim 2, wherein the processor corrects the tracking by combining a histogram-based CamShift algorithm when a shape of the object model is changed.

4. The real-time integrated data mapping device of claim 3, wherein the processor estimates a motion of the object model by applying a ransan algorithm based on the tracking feature points and updates the object model by a similarity transformation algorithm through the tracking.

5. The real-time integrated data mapping device of claim 4, wherein the processor performs the object detection by applying a Kalman filter when the updated object model is partially covered and the object model completely appears again to estimate the motion of the object model.

6. A real-time integrated data mapping method performed by a real-time integrated data mapping device including a processor and a non-transitory storage communicatively coupled to the processor, for product coordinates tracking data in an image content of multi-users, the method comprising:

provided a web interface for tracking a product in an image content to a user terminal;

receiving a request for product coordinates tracking from the user terminal with respect to the product designated by the user among the products displayed in the played back image content, when the image content is played back on the provided web interface;

providing automatic tracking coordinates to the user terminal in real-time by performing automatic tracking for the requested product coordinates tracking;

receiving correction coordinates corrected by a touch input of the user from the user terminal with respect to the automatic tracking coordinates on the web interface of the user terminal;

applying the received correction coordinates to the automatic tracking coordinates to generate the final product coordinates;

storing the final product coordinates in association with the image content and the product; receiving product information on the product from the user terminal, and stores the received product information;

detecting that another user terminal is playing the image content on the web interface of the another user terminal;

searching, from the storage, the final product coordinates with respect to the product displayed in the image content being played on the another user terminal;

transmitting, in real-time, the searched final product coordinates to the another user terminal that is playing the image content;

receiving a request for the product information on the product corresponding to the final product coordinates, from the another user terminal that is playing the image content; searching the requested product information from the storage; and transmitting, in real-time, the searched product information to the another user terminal that is playing the image content.

7. The real-time integrated data mapping method of claim 6, wherein the providing of the automatic tracking coordinates to the user terminal comprises detecting and designating an object model through an object detection algorithm with respect to the product corresponding to the touch input of the user on the user terminal, extracting and registering designated feature points as tracking feature points, and tracking the tracking feature points using a pyramid LK algorithm which is a sparse optical flow.

8. The real-time integrated data mapping method of claim 7, wherein the providing of the automatic tracking coordinates to the user terminal further comprising correcting the tracking by combining a histogram-based CamShift algorithm when a shape of the object model is changed.

9. The real-time integrated data mapping method of claim 8, wherein the providing of the automatic tracking coordinates to the user terminal further comprising estimating a motion of the object model by applying a ransan algorithm based on the tracking feature points and updating the object model by a similarity transformation algorithm through the tracking.

10. The real-time integrated data mapping method of claim 9, wherein the providing of the automatic tracking coordinates to the user terminal further comprising performing the object detection by applying a Kalman filter when the updated object model is partially covered and the object model completely appears again to estimate the motion of the object model.

* * * * *